Oct. 7, 1969     F. J. SCHUHE     3,470,628
INSTRUCTION DEVICE
Filed July 24, 1967
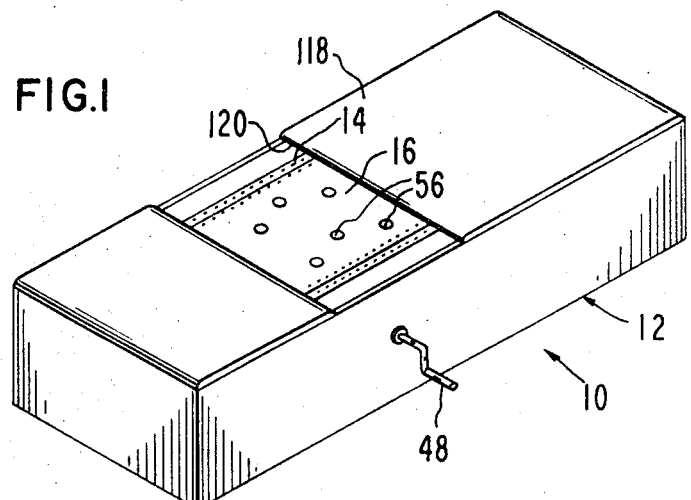
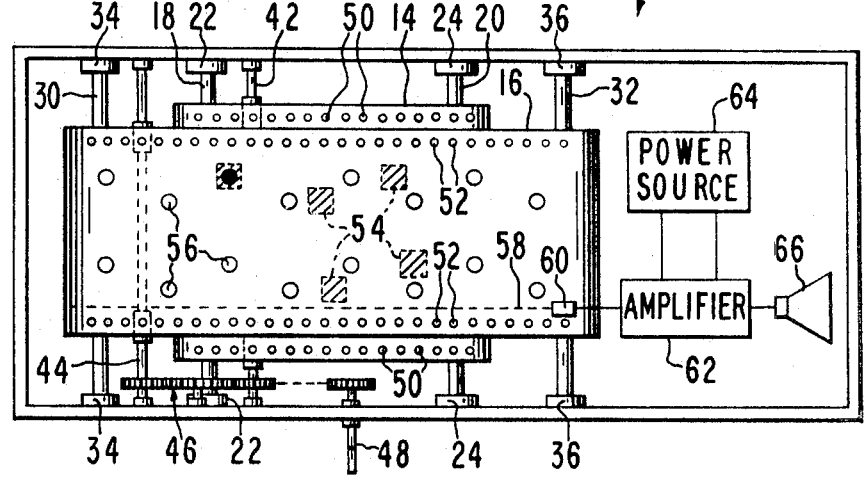
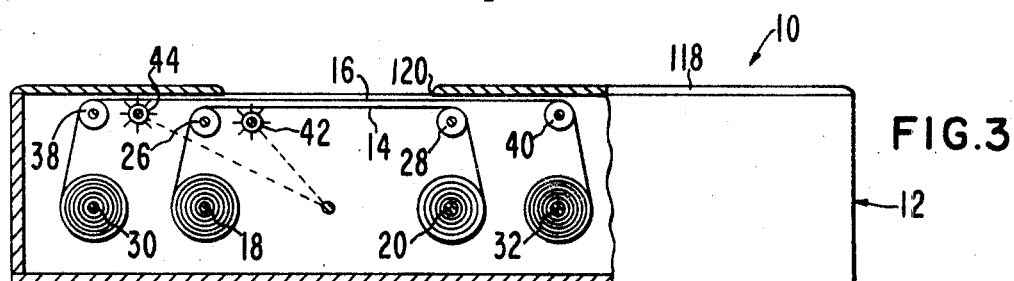
INVENTOR.
FRANK J. SCHUHE
BY
Townsend and Townsend
ATTORNEYS United States Patent Office 3,470,628
Patented Oct. 7, 1969

3,470,628
INSTRUCTION DEVICE
Frank J. Schuhe, 299 Menlo Oak Drive,
Menlo Park, Calif. 94025
Filed July 24, 1967, Ser. No. 655,370
Int. Cl. G09b 19/00, 29/06, 1/24
U.S. Cl. 35—29                9 Claims

ABSTRACT OF THE DISCLOSURE

An instruction device employing a pair of relatively shiftable webs, one of which has openings therethrough for permitting indicia on the other web to be observed in sequence as the webs move relative to each other. The apparatus is especially adapted for use for learning dance routines where the indicia represent the successive foot positions of a particular dance routine. Oral instruction can be applied on a sound track on one of the webs and played back in synchronization with the movement of the indicia into alignment with the openings.

---

This invention relates to teaching devices and, more particularly, to instruction apparatus which allows the user to view a number of instructional indicia or information in a predetermined sequence.

The present invention, in its preferred form, comprises structure which includes a pair of relatively shiftable webs, one of which has openings therethrough for viewing informational indicia on the other web in sequence as the webs move relative to each other. The indicia move into and out of alignment with respective openings and the user can view the indicia for a limited time through the openings and thereby will be able to learn the information represented by the indicia. Means is provided for moving the webs relative to each other to effect the movement of the indicia into and out of alignment with the openings. The webs are in juxtaposition relative to each other to facilitate the positioning or alignment of the indicia on one of the webs with the openings on the other web. To enhance the instructional capabilities of the apparatus, one of the webs may be provided with a sound track which moves past a suitable pickup for providing the input signal to a playback system, such as a power amplifier and speaker arrangement. In addition, the present invention can be of a size suitable for holding in the hand, whereby the user can operate the apparatus while performing manual functions, such as moving the feet during a dance exercise.

While the present invention is suitable for a number of different purposes, it is especially adapted for use in dance instruction which requires that the student learn the basic foot positions in sequence for executing a particular dance routine. The usual method of learning dance routines is for the student to dance with an instructor. By this method, however, the student learns the foot positions of a dance routine only by trial and error, a laborious process which oftentimes discourages students from continuing the instruction.

Instruction devices for use in learning dance steps have been provided in the past but, for the most part, these devices employ charts which are nothing more than representations of the dance floor with simulated footprints. The entire dance routine on the chart is viewable at a glance and the footprints are numbered to show the sequence of the foot positions in executing the dance routine. While such charts are movable to indicate the movement of a dancer over the floor, the simulated footprints do not move into and out of view to indicate successive foot positions. Moreover, the user of such a device cannot establish a definite rhythm by merely viewing the chart even though the latter is in motion.

The present invention overcomes this problem by providing apparatus which allows simulated foot positions to be observed successively and in a predetermined sequence so that not only will the student using the apparatus know where the feet are to be placed on the dance floor but also will be able to establish the rhythm that is to be used in performing the particular dance. The apparatus, also, allows a student to learn a particular dance without having to dance with an instructor since the student can perform the dance routine by himself while carrying the apparatus and observing the indicia on one of the webs through the respective openings in the other web. Moreover, the apparatus can be constructed so that it can be used for learning a number of different dances. The apparatus, therefore, represents an economical means of learning dance routines without requiring the time and expense of formal dance instruction.

The primary object of this invention is to provide instruction apparatus which utilizes a pair of relatively shiftable members with one of the members having informational indicia thereon which move into and out of alignment with respective openings in the other member as the members move relative to each other, whereby the user of the apparatus can view the indicia through the openings in a predetermined sequence and at a predetermined rate and thereby receive the information represented by the indicia and the rate at which they move into and out of view.

A further object of this invention is to provide apparatus of the type described wherein a pair of juxtaposed webs are mounted for movement relative to each other with one of the webs having openings therethrough and the other web having informational indicia thereon, whereby the apparatus can be used for viewing the indicia through said openings in sequence and at a predetermined rate as the webs move relative to each other.

A further object of this invention is to provide a dance instruction device utilizing web structure of the type described wherein the indicia on one of the webs represent the foot positions of a dance routine so that the user of the apparatus can learn the dance steps and the rhythm of the dance routine while holding the device and observing the indicia and the rate at which they come into and out of view through the openings in the other web.

A further object of this invention is to provide instruction apparatus of the aforesaid character wherein one of the webs is provided with a sound track thereon which cooperates with a pickup and playback system for permitting oral instruction to be given to the user while the user observes the information represented by the indicia as the webs move relative to each other.

Other objects of this invention will become apparent as the following specification progresses, reference being had to the accompanying drawing for an illustration of a preferred embodiment of the invention.

In the drawing:

FIG. 1 is a perspective view of the instruction device of the invention;

FIG. 2 is a top plan view of the device with the top removed and certain components shown schematically; and FIG. 3 is a side elevational view, partly in section, of the device showing the movable webs thereof.

A preferred embodiment of the apparatus of this invention is broadly denoted by the numeral 10 and includes a housing 12 which serves as a support for mounting a pair of flexible webs 14 and 16 therewithin. The web can be of any suitable material, such as paper or the like. The housing has a top 118 provided with a central opening 120 therein for viewing the webs.

Web 14 is mounted at its ends on a pair of shafts or reels 18 and 20 which are journaled in respective bearings 22 and 24 on the sides of housing 12 (FIG. 2). Web 14 is of a length allowing it to be partially wrapped about both reels 18 and 20 and it passes up and over a pair of idler rolls 26 and 28 so that a central stretch of the web is aligned with opening 120. As shown in FIG. 2, web 14 is wrapped on reels 18 and 20 and web 16 is wrapped on reels 30 and 32 so that these rails mount the webs for movement relative to the housing, whereby each web is wrapped on one reel as it is unwrapped from the other reel when the web is moved as hereinafter described.

Similarly, web 16 is coupled at the ends thereof to a pair of shafts or reels 30 and 32 which are generally parallel to shafts 18 and 20 and are mounted in respective bearings 34 and 36 secured to the inner sides of the housing. Web 16 has a considerable length so that it is partially wrapped on shafts 30 and 32. A pair of idler rolls 38 and 40 are rotatably mounted within housing 12 for guiding a straight stretch of web 16 adjacent to opening 120 and in juxtaposition to the straight stretch of web 14. Web 16 is disposed between opening 20 and web 14.

Means is provided for advancing the webs relative to each other. For purposes of illustration only, such means include respective sprockets 42 and 44 coupled to webs 14 and 16 and a gear train 46 for rotating the sprockets. A hand crank 48 projects outwardly from one side of the housing and operates the gear train to rotate the sprockets. The webs have sprocket holes 50 and 62 which mesh with the sprockets so that the webs are moved when the crank is rotated.

Gear train 46 may be of any construction. For purposes of illustration only, it is constructed so that web 16 moves in one direction as web 14 moves in the opposite direction. However, the gear train could be constructed so that the webs would move in the same direction and at different rates. Also, instead of using hand crank 48, other power sources could be used such as an electric motor, a windup spring or the like.

Web 14 is provided with a plurality of informational indicia 54 thereon which, for purposes of illustration, are shown in the form of indicator marks, but other indicia could be used, if desired. Web 16 is provided with a number of openings 56 therein which are alignable with respective marks 54 when the webs move relative to each other. The marks and openings are arranged in a predetermined order to give a preselected result when the webs move relative to the housing and to each other. The marks move into and out of alignment with certain of the openings and the user of the apparatus can view the marks in sequence by looking through the particular openings 56 which are viewable, of course, through opening 120.

It may be desirable to provide oral information along with the indicia for instructional purposes. To this end, one of the webs, such as web 16, is provided with a sound track 58 adjacent to one side edge thereof. A pickup, such as a magnetic read head 60 is carried by housing 12 and coupled to the sound track (FIG. 2). The output of pickup 60 is then directed to an amplifier 62 operated by a power source 64 which is preferably self-contained within housing 12. A speaker 66 coupled to amplifier 62 broadcasts the information picked up from the sound track. A suitable switching arrangement can be used with the amplifier and power source to allow for selective operation of the same.

While the present invention is suitable for a number of different uses, it is especially adapted for use in dance instruction. To this end, housing 12 may be of a size which allows the user to hold it in his hand to perform the various dance steps while the apparatus is carried and operated. Crank 48 can be rotated by the user as the apparatus is carried and as the indicia on web 14 are viewed in sequence.

When used in this way, marks 54 will represent the foot positions on a dance floor and since the marks move into and out of view with respect to openings 56, the user can obtain a sequential picture of the way in which his feet are to be positioned and moved on a dance floor to execute a particular dance routine. Moreover, the gear train and the drive means therefor can be constructed or adjusted so that the marks become aligned with respective openings at a predetermined rate so that the user not only is able to learn about foot positions and foot movements but also can be taught the particular rhythm associated with a dance routine. By viewing the marks as they become aligned with the openings, the user can establish immediately where his feet should be relative to each other and how one foot is to be moved into the next sucessive position. For instance, the marks 54 and openings 56, adjacent to one side of opening 120, may represent the left foot while the other marks and openings adjacent to the opposite side of opening 120 may represent the right foot. The relative locations of the holes and marks can be arranged to provide for turns in the dance routine. Also, the holes and marks corresponding to the left foot could cross over and be disposed in the region normally occupied by the holes of the right foot to allow for turns. A coloring system could be used to incorporate this feature in the apparatus. Also, other changes could be made to satisfy the desires of the user.

The webs would not necessarily be limited to a single dance routine. For instance, web 14 could be provided with indicia which would represent a number of different dance routines. Corresponding openings 56 would be provided in web 16 for such various dance routines.

While one embodiment of this invention has been shown and described, it will be apparent that other adaptations and modifications can be made without departing from the true spirit and scope of the invention.

What is claimed is:

1. Instruction apparatus comprising: a support; a member shiftably carried by the support and having an outer surface provided with a plurality of spaced instructional indicia thereon; a sheet element shiftably mounted on said support and having a number of openings therethrough, said sheet element being adjacent to and movable along said surface to cause said openings to be moved into and out of alignment with respective indicia, whereby indicia aligned with said openings may be viewed through the latter to provide an instructional exercise; and means coupled with the member and the sheet element for simultaneously moving the same relative to each other and to said support to permit the indicia to be viewed sequentially and at a controlled rate.

2. Apparatus as set forth in claim 1, wherein said member and said sheet element comprise a pair of relatively shiftable webs, each web having a longitudinal stretch in juxtaposition to a corresponding stretch of the other web.

3. Apparatus as set forth in claim 1, wherein said member and said sheet element comprise first and second webs, respectively, and wherein is included reel structure for each web, respectively, the reel structures being secured to said support for mounting respective webs thereon for movement relative thereto with a stretch of one of the webs being in proximity to and movable along the stretch of the other web, said stretch of said first web defining said surface, said moving means including a hand crank.

4. Apparatus as set forth in claim 3, wherein said webs move in opposite directions under the influence of said moving means.

5. Apparatus as set forth in claim 3, wherein one of the webs has a sound track thereon, and wherein is provided playback means coupled with said sound track for sensing the information thereon and for converting the information to an observable form as the webs move.

6. Apparatus as set forth in claim 3 wherein the support comprises a housing having a wall provided with an opening therethrough, said webs being within the housing in juxtaposition to each other and disposed adjacent to said opening, said second web being between said opening and the first web.

7. A dance instruction device comprising: a housing having a top provided with an opening therein; a pair of webs; reel structure for mounting each web respectively in said housing for movement relative thereto, each web having a stretch extending across said opening, the stretches of said webs being in juxtaposition relative to each other, the inner web having spaced indicia on the outer surface thereof, the outer web having spaced openings therethrough alignable with respective indicia with the spacing and the relative positions of said indicia and said openings being in accordance with a predetermined dance routine, whereby the indicia will represent foot positions in the execution of said dance routine; and means coupled with the webs for simultaneously moving the same relative to each other and to said housing, whereby said openings will move into and out of alignment with respective indicia.

8. A dance instruction device as set forth in claim 7, wherein said moving means causes said inner web to move in one direction and the outer web to move in the opposite direction.

9. A dance instruction device as set forth in claim 7, wherein is provided a pair of roller guides for each web respectively, the guides being disposed on respective sides of said opening to form said stretches.

References Cited

UNITED STATES PATENTS

| | | | |
|---|---|---|---|
| 1,375,490 | 4/1921 | Deming | 282—15 |
| 2,813,457 | 11/1957 | Fitzgerald. | |
| 2,837,837 | 6/1958 | Castle | 35—29 |
| 2,837,962 | 6/1958 | Kneitel. | |
| 2,871,580 | 2/1959 | Samdahl | 35—29 |
| 3,147,557 | 9/1964 | Maris | 35—74 X |
| 3,246,402 | 4/1966 | Diamond | 35—76 X |

EUGENE R. CAPOZIO, Primary Examiner

HARLAND S. SKOGQUIST, Assistant Examiner

U.S. Cl. X.R.

35—76